United States Patent
Suwa

(12) 
(10) Patent No.: US 11,503,215 B2
(45) Date of Patent: Nov. 15, 2022

(54) IMAGE PROCESSING APPARATUS, IMAGE PROCESSING METHOD, AND NON-TRANSITORY COMPUTER-READABLE STORAGE MEDIUM THAT NOTIFY A USER OF A REGION IN WHICH TONE CHARACTERISTICS CAN BE RESTORED

(71) Applicant: CANON KABUSHIKI KAISHA, Tokyo (JP)

(72) Inventor: Tetsuya Suwa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 343 days.

(21) Appl. No.: 16/808,623

(22) Filed: Mar. 4, 2020

(65) Prior Publication Data
US 2020/0288051 A1   Sep. 10, 2020

(30) Foreign Application Priority Data
Mar. 5, 2019   (JP) .............................. JP2019-039807

(51) Int. Cl.
*H04N 5/235*   (2006.01)
*G06K 9/00*    (2022.01)
*G06T 5/00*    (2006.01)

(52) U.S. Cl.
CPC ....... *H04N 5/2351* (2013.01); *G06K 9/00536* (2013.01); *G06T 5/007* (2013.01); *H04N 5/2355* (2013.01)

(58) Field of Classification Search
CPC ............... H04N 5/2351; H04N 5/2355; H04N 9/04551; G06K 9/00536; G06T 5/007; G06V 10/20
See application file for complete search history.

(56) References Cited

U.S. PATENT DOCUMENTS

| 6,608,926 | B1 |   | 8/2003 | Suwa et al. |
|---|---|---|---|---|
| 6,694,051 | B1 |   | 2/2004 | Yamazoe et al. |
| 7,924,469 | B2 |   | 4/2011 | Ono et al. |
| 8,237,991 | B2 |   | 8/2012 | Ono et al. |
| 9,135,523 | B2 |   | 9/2015 | Kato et al. |
| 9,253,374 | B2 | * | 2/2016 | Kobayashi ............. H04N 5/202 |
| 9,652,687 | B2 |   | 5/2017 | Sato |

(Continued)

FOREIGN PATENT DOCUMENTS

| JP | H11-75076 A   | 3/1999 |
|----|---------------|--------|
| JP | 2015-156615 A | 8/2015 |

*Primary Examiner* — Luong T Nguyen
(74) *Attorney, Agent, or Firm* — Venable LLP

(57) ABSTRACT

An image processing apparatus including at least one processor coupled to a memory, serving as a first obtainment unit to obtain a luminance value of image data corresponding to a first luminance range, a second obtainment unit to obtain information for a second luminance range that is less than the first luminance range, a classification unit to classify, based on a correspondence relationship of luminance value conversion from the first luminance range to the second luminance range, the first luminance range of the image data into a plurality of regions, and a display unit to cause a display device to display an image based on the image data such that a pixel of the image having a luminance value belonging to a region, in which a tone characteristic in the image data can be restored when the luminance value conversion is performed, can be specified in the displayed image.

20 Claims, 10 Drawing Sheets

(56) References Cited

U.S. PATENT DOCUMENTS

| | | | |
|---|---|---|---|
| 10,319,085 B2* | 6/2019 | Min | G06T 5/009 |
| 10,582,087 B2 | 3/2020 | Ogawa et al. | |
| 10,650,504 B2* | 5/2020 | Shin | G03B 27/80 |
| 10,825,153 B2* | 11/2020 | Yokota | G06T 5/009 |
| 2009/0290045 A1* | 11/2009 | Fukuda | H04N 19/186 |
| | | | 382/166 |
| 2012/0268759 A1 | 10/2012 | Ono et al. | |
| 2015/0245000 A1 | 8/2015 | Sato | |
| 2020/0007734 A1 | 1/2020 | Kagawa et al. | |
| 2020/0013149 A1 | 1/2020 | Yazawa et al. | |

\* cited by examiner

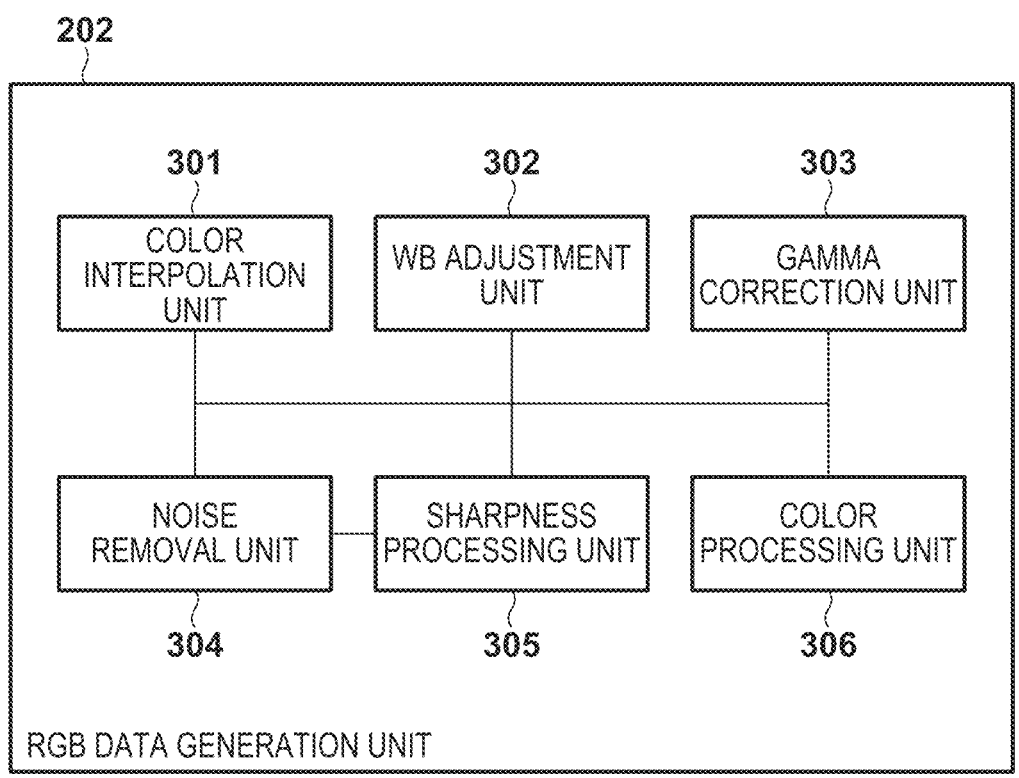

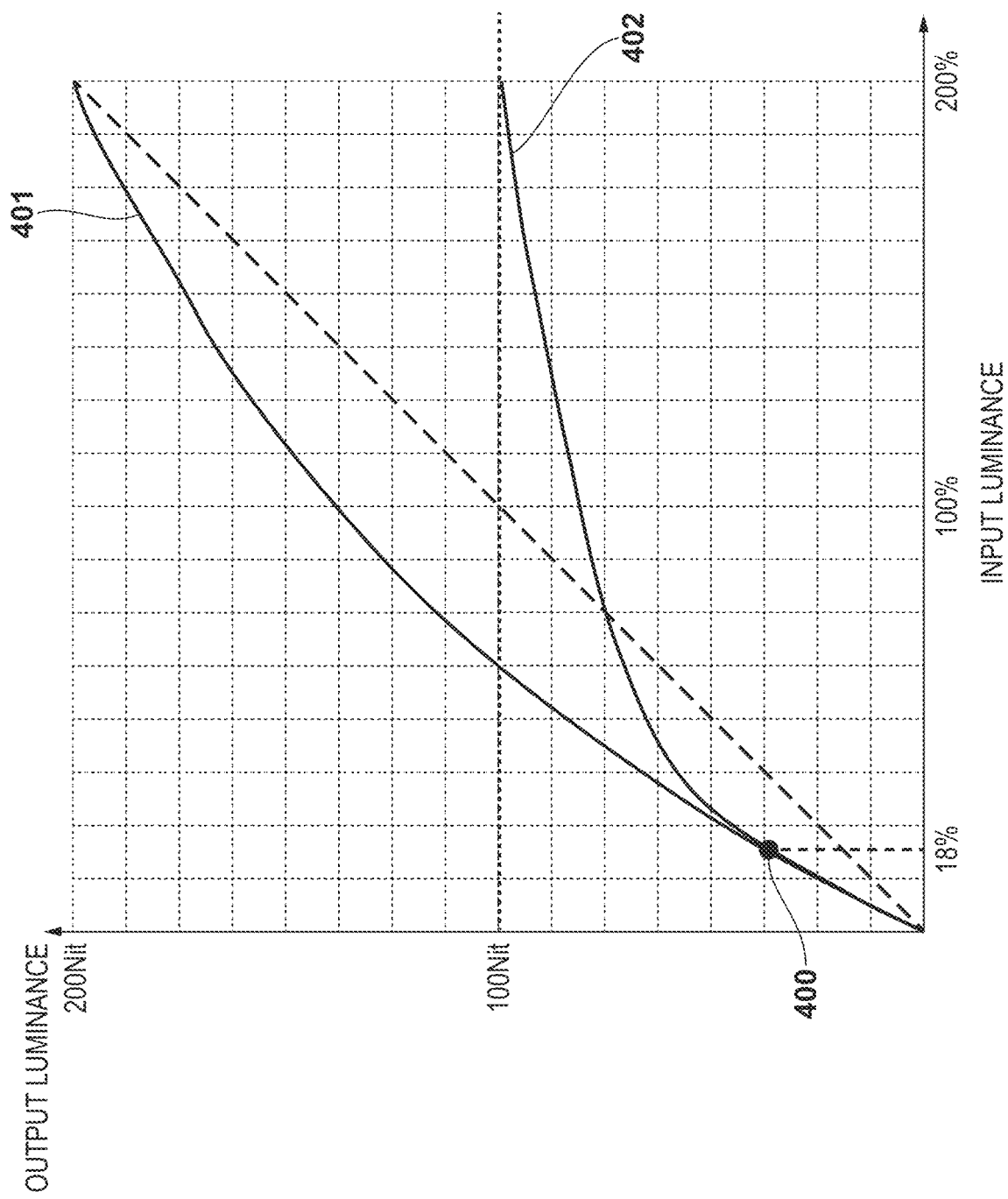

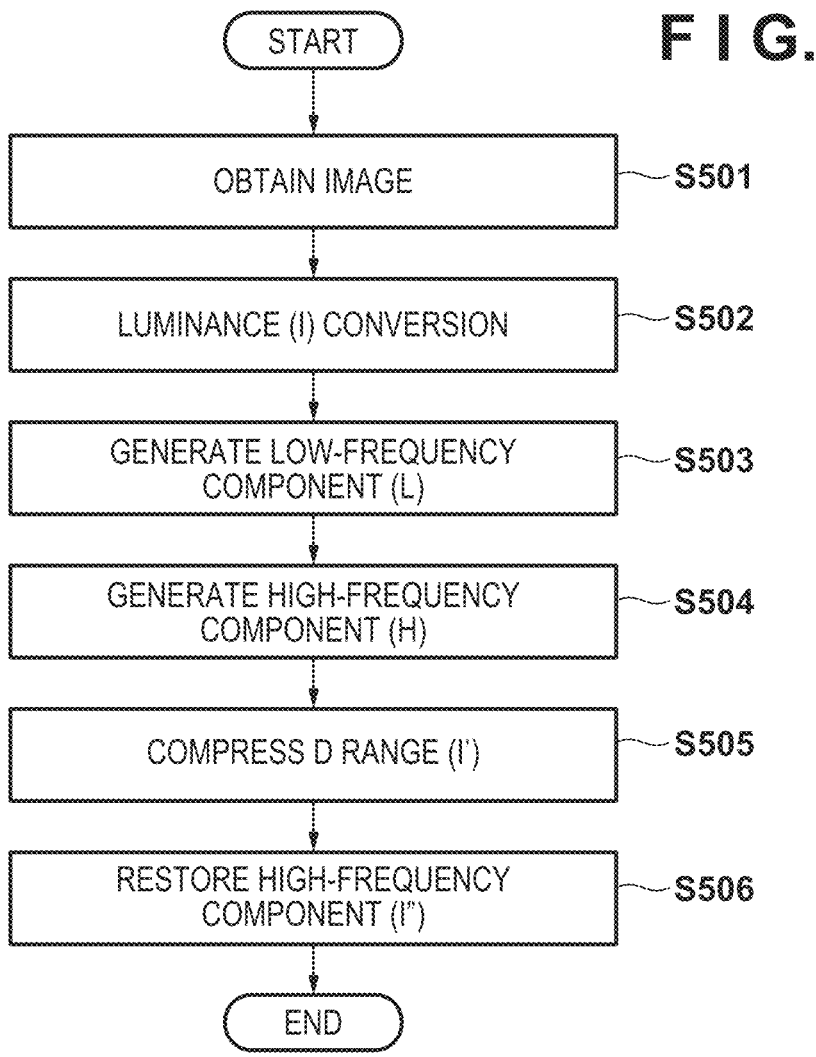

IMAGE PROCESSING APPARATUS, IMAGE PROCESSING METHOD, AND NON-TRANSITORY COMPUTER-READABLE STORAGE MEDIUM THAT NOTIFY A USER OF A REGION IN WHICH TONE CHARACTERISTICS CAN BE RESTORED

BACKGROUND OF THE INVENTION

Field of the Invention

This application claims the benefit of Japanese Patent Application No. 2019-039807, filed Mar. 5, 2019, which is hereby incorporated by reference herein in its entirety.

The present invention relates to an image processing apparatus, an image processing method, and a non-transitory computer-readable storage medium.

Description of the Related Art

Conventionally, an image obtained in an image shooting operation by a digital camera, or the like, is obtained in a general-purpose format such as JPEG (Joint Photographic Expert Group), and image processing is performed on the obtained data.

In order to obtain a higher quality image, there is a method that uses sensor light reception data (to be referred to as RAW data hereafter). In image processing using RAW data, saturation of bit precision is a detrimental effect that may occur in the processing. In the case of an 8-bit image with 256 tones (0 to 255), pixels exceeding 255 can be generated in gain processing in which a predetermined magnification is applied by, for example, image correction or the like, and tone degradation is caused by the saturated pixels. Japanese Patent Laid-Open No. 11-75076 discloses a technique in which a saturated pixel is output as a warning by gain adjustment.

On the other hand, in recent years, the luminance of a display apparatus used for image display is increasing. Although a display apparatus that has a luminance of about 100 nits (nit is a unit of luminance) was used conventionally, display apparatuses that have a luminance of over 1,000 nits are beginning to be used in accordance with the advancement of light source techniques, and the like.

In the image correction procedure of RAW data, there can be case in which a pixel which is a saturated pixel on the display may not become a saturated pixel in the subsequent processing. This is due to the difference between the information included in the RAW data and the RGB data used in the display. Also, in the RAW data, whether the tone of an image can be restored changes in accordance with the state of the image at the time of an image capturing operation.

In a case in which the degree of influence on image correction at the time of the image capturing operation is left unknown, it becomes difficult to grasp the contents and the extent of processing performed on each region of the captured image. In addition, in a case in which notification of the degree of influence in image correction at the time of the image capturing operation is to be performed, display needs to be performed by considering the arrangement of recent display apparatuses that perform a display operation by high luminance.

SUMMARY OF THE INVENTION

The present invention in one aspect provides an image processing apparatus comprising a first obtainment unit configured to obtain a luminance value of image data corresponding to a first luminance range, a second obtainment unit configured to obtain information for a second luminance range that is smaller than the first luminance range, a classification unit configured to classify, based on a correspondence relationship of luminance value conversion from the first luminance range to the second luminance range, the first luminance range of the image data into a plurality of regions and a display unit configured to cause a display device to display an image based on the image data such that a pixel of the image that has a luminance value belonging to a region, in which a tone characteristic in the image data can be restored in a case when the luminance value of the image data is converted to a luminance value corresponding to the second luminance range, can be specified in the displayed image.

According to the present invention, it is possible to notify a user of a region in which the tone characteristic can be restored in an image.

Further features of the present invention will become apparent from the following description of exemplary embodiments with reference to the attached drawings.

BRIEF DESCRIPTION OF THE DRAWINGS

FIG. 3 is a block diagram showing an example of the arrangement of an RGB generation unit according to the first embodiment of the present invention;

FIG. 4 is a graph showing an input luminance and the conversion of the luminance of a display apparatus according to the first embodiment of the present invention;

FIG. 5 is a flowchart of highlight restoration processing according to the first embodiment of the present invention;

FIG. 6 is a view showing a filter for obtaining a first low frequency component of the present invention;

DESCRIPTION OF THE EMBODIMENTS

Figure 1:
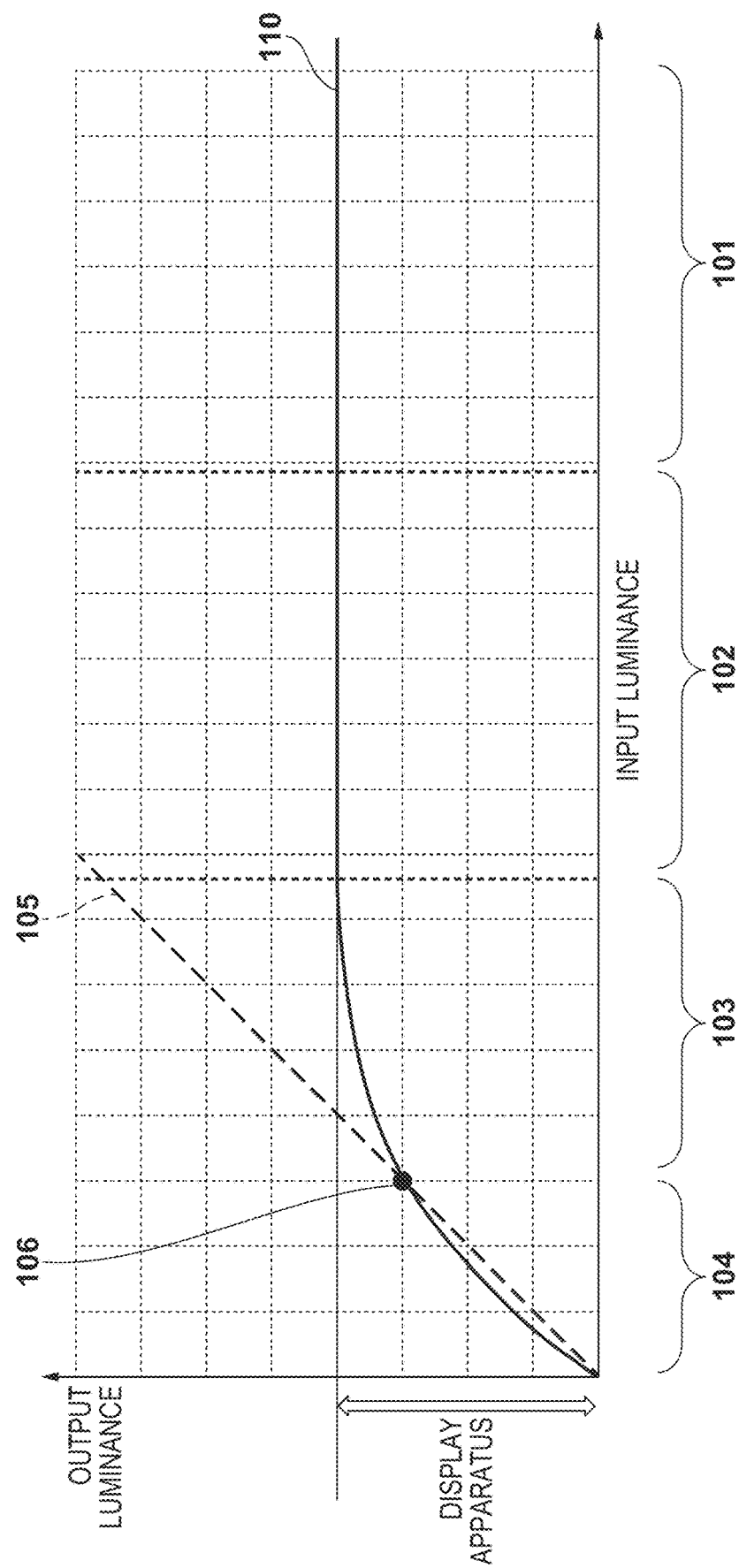
FIG. 1 is a view for explaining the details of a problem of the present invention.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given the same or similar configurations, and a redundant description thereof is omitted.

[Explanation of Region in which Tone can be Restored]

FIG. 1 is a graph showing a correspondence relationship between an input luminance and an output luminance. In FIG. 1, the abscissa indicates the luminance of a scene to be captured, and the ordinate indicates the output luminance when the luminance of an image is to be displayed by a display apparatus. A conversion characteristic 110 in FIG. 1 shows a conversion characteristic for displaying an image. In a general image capturing apparatus, the input luminance and the output luminance have a relative relationship so that the luminance value, of a captured scene, obtained by measuring light will be a predetermined output value.

Since the region of scene luminance 101 falls in a high-luminance range in which the output values of the RGB sensors of the image capturing apparatus will become fully saturated at the time of an image capturing operation, the pixels will be displayed as pixels in which R (red), G (green), and B (blue) signals are fully saturated, that is, the pixels will be displayed as white pixels. In the region of scene luminance 102, the pixels will become white pixels because the R, G, and B signals will become fully saturated when, for example, clipping is performed. However, for example, in a case in which a method such as that disclosed in Japanese Patent Laid-Open No. 2015-156615 is used in the scene luminance 102, the scene luminance 102 will fall in a luminance range in which the pixels will not become saturated. As a result, although both luminance scenes described above have white pixels, the tone cannot be restored in the scene luminance 101 while the tone can be restored in the scene luminance 102.

Note that although the processing according to Japanese Patent Laid-Open No. 2015-156615 can prevent the region of the scene luminance 102 from turning into a white pixel region, it may not always be desirable for the tone of the region of the scene luminance 102 to be restored. There may be a case in which the changing of the region of the scene luminance 102 into a white pixel region will cause the pixels of a highlight portion to change into white pixels, and an image with good contrast may be obtained as a result. Thus, tone restoration should be selected in accordance with the intention of the user.

Furthermore, referring to a region in a low-luminance portion, it can be seen that both regions of scene luminance 103 and scene luminance 104 have not changed into a white pixel region and have tonality. A dotted line 105 shown in FIG. 1 represents a case in which the output luminance is the same as the input luminance A case with a tilt greater than the dotted line 105 can be assumed to be a case in which the scene is expressed at least without the degradation of luminance tonality. On the other hand, a case with a tilt less than the dotted line 105 can be assumed to be a case in which the luminance tonality of the scene has been degraded although the tonality is present. A point 106 shown in FIG. 1 is an intersection point of the dotted line 105 and the conversion characteristic 110, and the low-luminance side tilt increases and the high-luminance side tilt decreases from this point as a boundary.

As described above, each of the scene luminance 101, the scene luminance 102, and the scene luminance 103 is a region that has reduced tonality. As described above, among these regions, the tonality of the scene luminance 101 cannot be restored.

The purpose of the present invention is to notify a user of scene luminance regions that have different degrees of tone restoration as described above.

First Embodiment

[Image Processing Apparatus]

Figure 2:
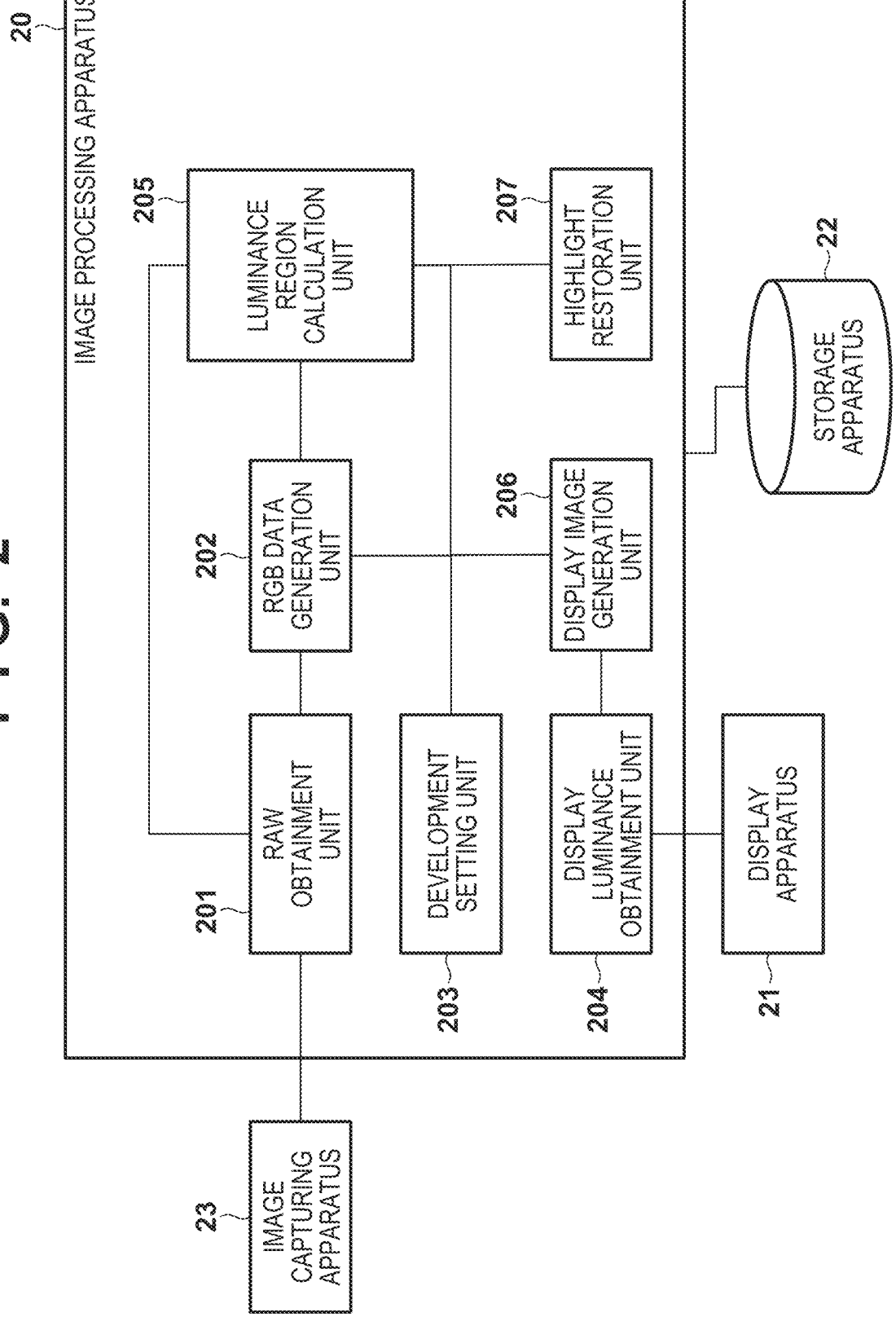
FIG. 2 is a block diagram showing an example of the arrangement of an image processing apparatus according to the first embodiment of the present invention.

FIG. 2 shows an example of the arrangement of a system according to this embodiment. In this embodiment, the system is formed by an image processing apparatus 20, a display apparatus 21, a storage apparatus 22, and an image capturing apparatus 23. The display apparatus 21, the storage apparatus 22, and the image capturing apparatus 23 are connected to the image processing apparatus 20. Note that a printing apparatus (not shown) may be connected to the image processing apparatus instead of the storage apparatus 22. Also, although it is not shown in the drawing, each apparatus includes a CPU, a RAM, and a ROM for controlling and operating each block. Note that the apparatuses provided in the system need not be separate individual apparatuses and may be integrated into a single apparatus or a plurality of apparatuses.

The image processing apparatus 20 includes a RAW obtainment unit 201, an RGB data generation unit 202, a development setting unit 203, a display luminance obtainment unit 204, a luminance region calculation unit 205, a display image generation unit 206, and a highlight restoration unit 207.

The RAW obtainment unit 201 obtains RAW data that is obtained when a target scene is photoelectrically converted by a sensor (image capturing element) through a lens in the image capturing apparatus 23. The image capturing apparatus 23 obtains the RAW data by performing an image capturing process based on a predetermined exposure condition. Note that the RAW data obtainment method is not limited to this. The RAW obtainment unit 201 may obtain RAW data captured in advance by the image capturing apparatus 23 via a detachable memory storage device (not shown).

The RGB data generation unit 202 generates RGB data by determining the tone characteristic based on a development setting value preset in the development setting unit 203 by the user and a luminance value of the display apparatus 21 obtained by the display luminance obtainment unit 204.

FIG. 3 shows the detailed arrangement of the RGB data generation unit 202 according to this embodiment. The RGB data generation unit 202 is formed by a color interpolation unit 301, a white balance (WB) adjustment unit 302, a gamma correction unit 303, a noise removal unit 304, a sharpness processing unit 305, and a color processing unit 306. The color interpolation unit 301 performs debayering or mosaicking on each pixel of the RAW data formed by a single color (R, G, or B) signal. The WB adjustment unit 302 applies white balance processing in accordance with the settings of the development setting unit 203. More specifically, the WB adjustment unit will multiply each of R, G, and B signals by a set coefficient. The gamma correction unit 303 performs gamma correction by considering, in addition to the settings of the development setting unit 203, the luminance of the display apparatus 21 obtained by the display luminance obtainment unit 204. In addition, noise removal processing by the noise removal unit 304 and sharpness processing by the sharpness processing unit 305 are applied as needed. The color processing unit 306 adjusts the hue and suppresses color curving in a high-luminance range region. As described above, the RAW data is converted into RGB data according to the settings of the user by the processing performed in each block of the RGB data generation unit 202.

An explanation will be given by returning to FIG. 2. The luminance region calculation unit 205 calculates the luminance region of the RAW data based on the RAW data obtained by the RAW obtainment unit 201, the development setting value accepted via the development setting unit 203, and the luminance value of the display apparatus 21 obtained by the display luminance obtainment unit 204. This processing will be described in detail later.

The display image generation unit 206 generates a display image based on the luminance region calculated by the luminance region calculation unit 205 and the RGB data generated by the RGB data generation unit 202. If the highlight of an image as RGB data is to be subsequently restored, the highlight restoration unit 207 will apply the processing on the image.

[Highlight Restoration Processing]

Highlight restoration processing performed by the highlight restoration unit 207 according to this embodiment will be described next. FIG. 4 shows an example of a case in which an input luminance range (dynamic range: to be abbreviated and referred to as D range hereafter) is greater when the input D range and an output D range are different from each other. Assume that the input D range is at 200% and that the output-side apparatus (the display apparatus 21 in this case) has a luminance of 100 nits. If display is to be performed at a luminance of 1%=1 nit, an output D range of 200 nits is needed when display is to be performed at 200%.

In FIG. 4, a curve 401 represents a case in which output is performed at an output D range of 200 nits. The curve 401 is not a straight line and passes a point 400. The point 400 is the luminance obtained by measuring the light of a predetermined region within a scene, and the luminance value is set so that it will be a predetermined output luminance value. Since the luminance of the scene will be determined based on the point 400 as a reference, it becomes necessary for a curve to pass the point 400, and the curve 401 has been generated in accordance to this requirement. That is, an ideal display state is obtained when an image data output based on the curve 401 is displayed by a display apparatus with luminance of 200 nits. In the case of the example shown in FIG. 4, the point 400 is positioned at 18% in the input-side luminance range.

On the other hand, in this example, since a conversion characteristic curve such as a curve 402 is applied since a display apparatus that has a luminance of 100 nits is assumed to be the output apparatus. Since the curve 402 also passes through the point 400 as a reference, the luminance of the photometric point (the point 400) will not change even if the luminance of the display apparatus changes. For example, in the case in which an image of a person (portrait) is to be captured, the skin region of a face, or the like, will be this aforementioned point, and the luminance value of the skin color on the display will not change regardless of the luminance of the display apparatus. To absorb the difference between the input and output D ranges in this case, the tonality of the highlight portion (corresponding to a region on the high-luminance side on the right side of FIG. 4) will need to be reduced. Since the tilt of the curve 402 becomes smaller in the high-luminance side than the point 400, a so-called "dull image" with reduced contrast on the high-luminance side will be obtained as a result. To avoid such an image, it is possible to use a method for implementing an image with a contrast by setting pixels that have a predetermined luminance or more as white pixels. However, applying this method can reduce the tonality of the highlight portion.

The highlight restoration processing according to this embodiment applies a process that can restore the highlight portion while maintaining the contrast by retinex processing. In retinex processing, an image is separated into illumination light components and reflected light components, and D range compression is performed on the illumination light components while holding the reflected light components so that D range compression will be implemented while the contrast of the original image is held. It can be said that the illumination light components are, substantially, low-frequency components, and that the reflected light components are, substantially, high-frequency components. In this embodiment, these components will be described uniformly as low-frequency components and high-frequency components hereafter.

[Retinex Processing]

FIG. 5 shows a flowchart of retinex processing used in this embodiment. This processing procedure is executed by, for example, the highlight restoration unit 207.

In step S501, the highlight restoration unit 207 obtains an image that includes target R, G, and B signals. In this embodiment, the RGB data generated by the RGB data generation unit 202 corresponds to the image obtained here.

In step S502, the highlight restoration unit 207 converts each pixel of the RGB image into a luminance value in accordance with $$Y=0.299 \cdot R+0.587 \cdot G+0.114 \cdot B \tag{1}$$

where the symbol "·" represents a product.

In step S503, the highlight restoration unit 207 performs frequency decomposition on the luminance value of each pixel converted in step S502 to obtain a low-frequency component. A low-frequency component L is generated by performing filtering processing on a luminance component. The filtering processing will be described by using the example of a Gaussian filter with reference to FIG. 6. In a filter 601, the filter size is 5×5, and a coefficient value has been set for each pixel. Letting x and y be the horizontal direction and the vertical direction, respectively of the image, p(x, y) be a pixel value of coordinates (x, y), and f(x, y) be a filter coefficient value, the filtering processing can be performed for each pixel of interest by a method expressed as follows $$L(x,y)=\{1/\Sigma f(x,y)\} \cdot \Sigma \{f(x,y) \times p(x,y)\} \tag{2}$$

where the symbol "·" represents a product. The calculation of equation (2) is performed about a filter 602 as the center for each filter scanning operation of the image data. When all of the pixels have been scanned by using the filter 601, a low-frequency component image is obtained (L(x, y)).

Note that although this embodiment described an example in which the filter characteristic has a Gaussian shape, the present invention is not limited to this. For example, an edge-preserving filter such as a bilateral filter may be used. Using an edge-preserving filter will allow the halo of an artifact generated at an edge portion to be reduced when contrast correction is performed.

In step S504, the highlight restoration unit 207 extracts a high-frequency component H by using the low-frequency component L generated in step S503. Letting I be an input luminance image based on the luminance value of each pixel converted in step S502, the high-frequency component H can be calculated as follows $$H=I/L \tag{3}$$

Note that although the high-frequency component H is generated by dividing the input luminance image I by the low-frequency component L in equation (3) described above, the high-frequency component H may be obtained by subtracting the low-frequency component L from the input luminance image I as expressed in the following manner $$H=I-L \tag{4}$$

In step S505, the highlight restoration unit 207 executes D range compression on the low-frequency component L. A conversion such as that represented by the curve 402 of FIG. 4 is performed in this case. More specifically, conversion may be performed on the input luminance by referring to a lookup table in which a corresponding post-compression conversion value has been written or processing may be performed in accordance with a preset conversion formula. A generated image I' is an image that has undergone only the D range compression, and is a so-called "dull image" in which the range matches the display-side luminance of 100 nits, but the contrast is low.

In step S506, the highlight restoration unit 207 corrects the reduction in the contrast by superimposing the high-frequency component H generated in step S504 on the image I' generated in step S505. Letting the processed image be an image I", a restored image can be obtained by $$I''=I'*H \qquad (5)$$

The D range of the image I" matches 100 nits, which is the display-side luminance range. Furthermore, the contrast of the high-frequency component of the image I" is held at the contrast before the D range compression was performed, that is, an image having the characteristic of the curve 401 of FIG. 4 has been obtained. As a result, a D range compressed image in which the contrast has been held is generated.

Note that although each illumination light component and each reflected light component of the retinex processing have been described as a low-frequency component and a high-frequency component, respectively, each frequency need not be uniform and may be changed in accordance with the viewing environment such as the size of the display apparatus, or the like. The viewing environment in this case may be the brightness of the position in which the display apparatus is set or may be an attribute of a print medium or the like to be used as a print product in a case in which the image is to be output as a print product. In addition, other than the luminance range of the output apparatus or the viewing environment, a piece of output information to be referred may be used.

On the other hand, although this processing can obtain an image in which the highlight portion has been restored, it is not preferable to apply this processing on every image. For example, a sharp image with good contrast can be obtained easily by removing the highlight portion. Removing the highlight portion has merits such as the removal of unnecessary information other than the main subject, facilitating preferable image quality by increasing the luminance of a blurred region (a portion with a so-called "soap-bubble bokeh") in the background, and the like.

Note that although the highlight restoration unit 207 is provided in the image processing apparatus 20 to which the image capturing apparatus 23 and the display apparatus 21 are attached in this embodiment, the main processing unit may be incorporated in another image processing apparatus. For example, it can be implemented by executing the processing in an application on a PC (personal computer) for retouching an image, and performing highlight restoration processing on the captured image data by loading the data to the PC.

[Luminance Region Calculation Processing]

Figure 7:
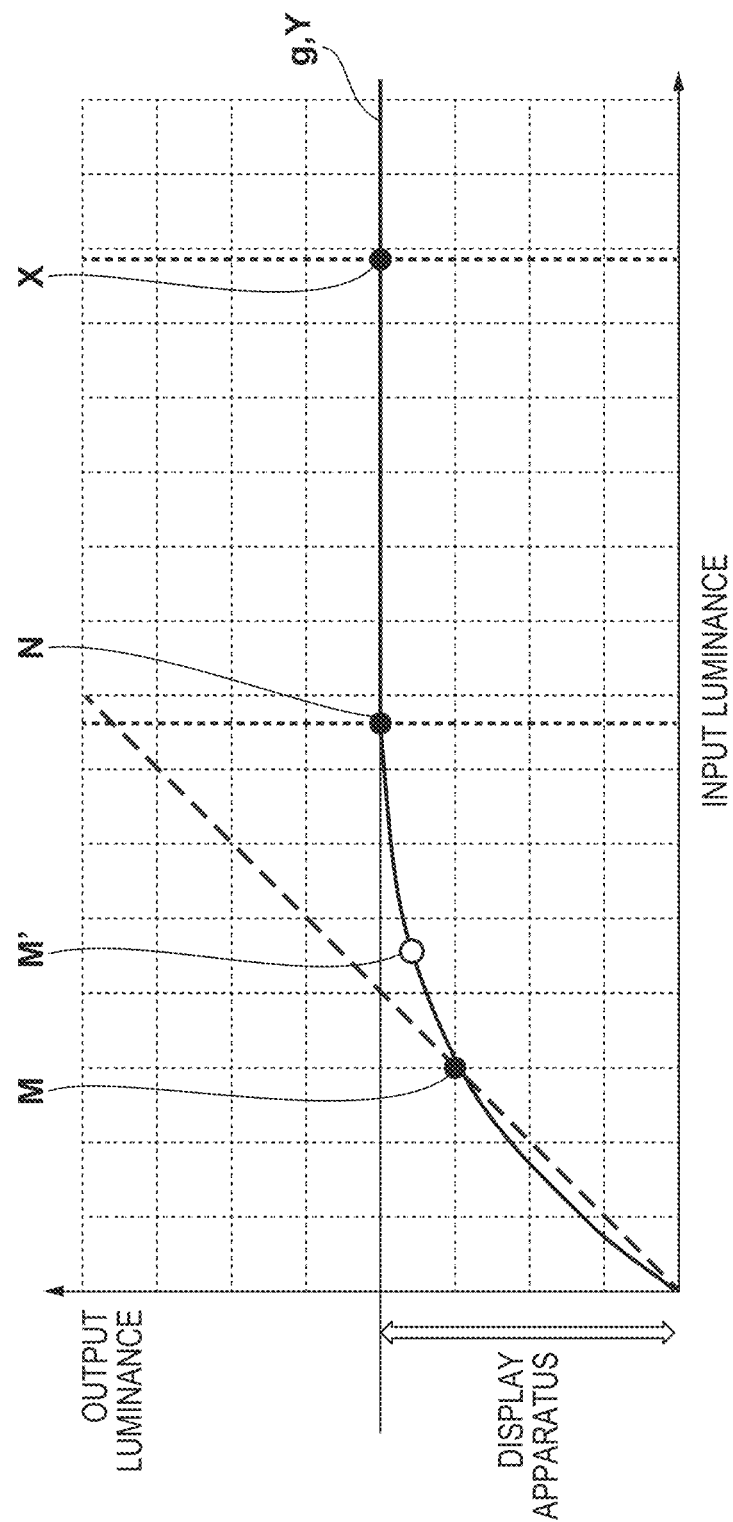
FIG. 7 is a graph for explaining a luminance region calculation unit according to the first embodiment of the present invention.

The luminance region calculation processing of the luminance region calculation unit 205 according to this embodiment will be described next. FIG. 7 assumes a case in which data of a predetermined input D range is to be displayed on a display apparatus that has an output luminance Ynit that is less than the input D range. The abscissa indicates the input luminance and the ordinate indicates the output luminance in FIG. 7.

First, a fully-saturated luminance point X, which is the fully-saturated luminance is calculated. This fully-saturated luminance point X is determined by, for example, the white balance setting and the sensor characteristic of the image capturing apparatus. That is, the luminance value corresponding to the fully-saturated luminance point X can be determined based on the image capturing information of the image capturing apparatus. As an example, assume a case in which image reading is performed by the sensor and a saturation point is expanded in replacement processing disclosed in Japanese Patent Laid-Open No. 2015-156615 described above. A signal value obtained by dividing a signal output value, in which all of the R, G, and B channels are saturated, by the white balance coefficient of each channel. The fully-saturated luminance point X in which all of the channels are saturated can be obtained by inversely calculating the scene luminance to be obtained from the obtained value. In general, since saturation starts in the order of the G channel, the B channel, and the R channel, the fully-saturated luminance point X is the luminance value at which the final R channel is saturated. In FIG. 7, a region closer to the right sight than the fully-saturated luminance point X corresponds to a region in which the tone cannot be restored.

A tone degradation luminance point M is calculated next. First, a saturation starting point N that is the saturation value of the output luminance corresponds to the luminance at which one of the channels of the sensor becomes saturated. As described above, since saturation starts from the G channel in general, the saturation starting point N is the luminance value at which the G channel will reach the saturation value. In FIG. 7, a region between the fully-saturated luminance point X and the saturation starting point N corresponds to a region in which the tone can be restored. A luminance conversion curve g(Y) is generated based on the display luminance value of the display apparatus 21 obtained by the display luminance obtainment unit 204, the saturation starting point N, and the gamma curve set by the user. Y represents the input luminance in this case.

The above-described setting of the user is classified for each application purpose such as for capturing a scenery, a portrait, and the like, and a gamma curve characteristic corresponding to the application purpose can be reflected. Also, the settings may be made so that it will be based on the image quality to be implemented or the output application purpose such as for capturing an accurate reproduction, a detail-oriented image, and the like. These settings can be made by using, for example, a UI (user interface) provided by the image processing apparatus 20.

As a characteristic of the luminance conversion curve g(Y), a luminance higher than the saturation starting point N is converted as a saturated pixel. That is, an image with high contrast can be implemented even if a saturation region of the highlight portion is present.

The tone degradation luminance point M can be obtained from an intersection point of the luminance conversion curve g(Y) and a 45° line representing where the input luminance and the output luminance match. The tilt of the luminance conversion curve g(Y) decreases in a region closer to the high luminance side than the tone degradation luminance point M, and tone degradation will occur in this region. Note that the tone degradation luminance point M need not always be the intersection point of the luminance conversion curve g(Y) and the 45° line. For example, it is possible to set a luminance value of a point at which the tilt of the luminance conversion curve g(Y) becomes smaller than a predetermined value and the tone degradation becomes conspicuous. More specifically, a point M' shown in FIG. 7 may be set as the tone degradation luminance point. In this case, a derivative g'(Y) of the luminance conversion curve g(Y) will be used to obtain a point that becomes a predetermined tilt S as follows. That is, this case will satisfy $$g'(M') \leq S \quad (6)$$

S may be set based on the characteristics of human vision by designating the smallest tilt value at which the change in tonality becomes undetectable by a human.

Note that information written as metadata in the RAW data obtained by the RAW obtainment unit 201 may be used to make the setting for determining the white balance coefficient described above, the gamma curve setting, and the like. Alternatively, an obtainment unit for these settings may be provided separately. As described above, the tone degradation luminance point M and the fully-saturated luminance point X of a predetermined setting condition are calculated by this processing.

Figure 8:
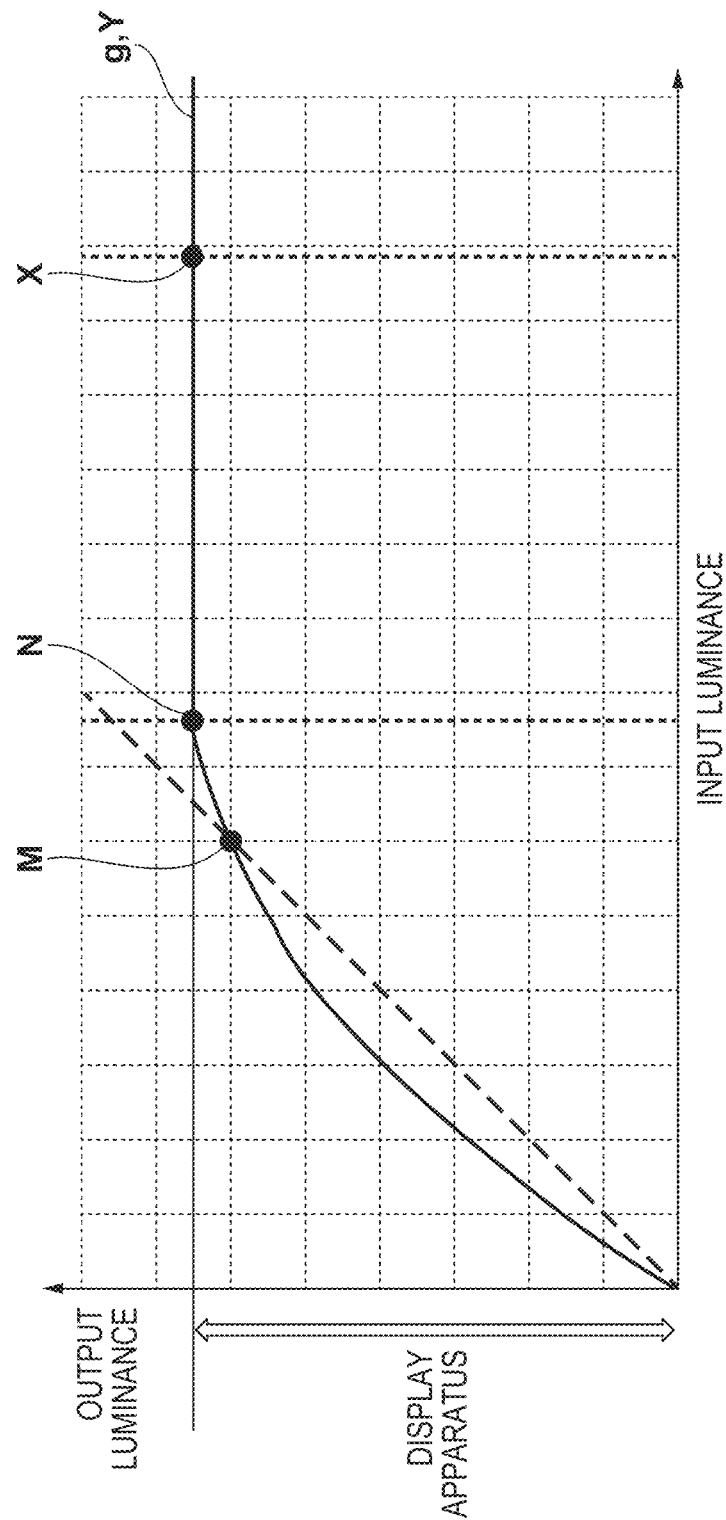
FIG. 8 is a graph for explaining the luminance region calculation unit of a high luminance display apparatus according to the first embodiment of the present invention.

FIG. 8 shows a graph of a case in which the luminance of the display apparatus as the output-side apparatus is different in a setting example similar to that described in FIG. 7. Since the luminance of the display apparatus is higher than FIG. 7, the D range of the ordinate has increased. In accordance with this increase, the tone degradation luminance point M has increased compared to that of FIG. 7. On the other hand, the fully-saturated luminance point X that is determined by the sensor characteristic and the white balance setting remains the same as in the case of the display luminance of FIG. 7.

[Display Image Generation Processing]

Figure 9:
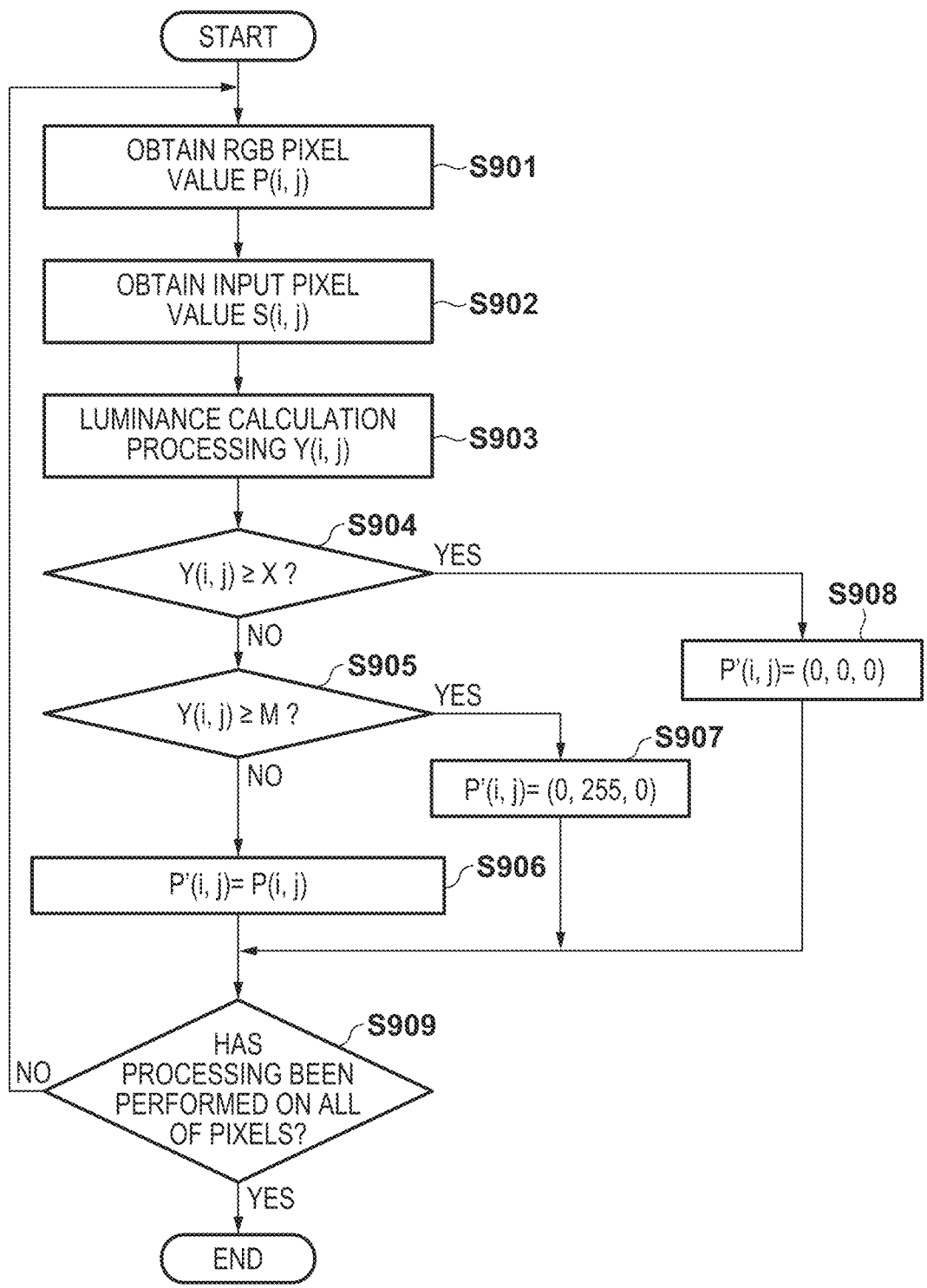
FIG. 9 is a flowchart of processing of the luminance region calculation unit according to the first embodiment of the present invention.

A display image generated by the display image generation unit 206 based on the tone degradation luminance point M and the fully-saturated luminance point X determined by the luminance region calculation unit 205 will be described next. FIG. 9 is a processing procedure that generates a display image according to this embodiment. This processing is executed by the display image generation unit 206.

In this processing, a region that is fully saturated and cannot be restored by subsequent processing will be displayed by using a black pixel (R, G, B)=(0, 0, 0), and a region in which the tone is to be restored will be displayed by using a green pixel (R, G, B)=(0, 255, 0) (assume that the signal value is an 8-bit signal value ranging from 0 to 255). Note that the color combination used in the display is not limited to that described above and may be set arbitrarily by, for example, the user.

In addition, assume that P(i, j) is a pixel value of a target image I generated by the RGB data generation unit 202, and P'(i, j) is a pixel value of a generated display image I'. Here, i and j represent pixel positions in the image and are 0≤i≤horizontal width pixel count and 0≤j≤vertical width pixel count, respectively. In this case, an origin (0, 0) is at the upper left corner of the target image I.

In step S901, the display image generation unit 206 obtains the pixel value P(i, j) of a target pixel position.

In step S902, the display image generation unit 206 obtains a pixel S(i, j) that has undergone only the processing operations by the color interpolation unit 301 and the WB adjustment unit 302 in the RGB data generation unit 202. Processing performed to change the luminance such as that by the gamma correction unit 303 is not performed on the pixel S(i, j), and R, G, and B values of the luminance of the captured scene itself are obtained as a result.

In step S903, the display image generation unit 206 converts the pixel S(i, j), which is in an RGB format, into a luminance value Y(i, j). This conversion can be performed based on equation (1) described above.

In step S904, the display image generation unit 206 compares the luminance value Y(i, j) and the fully-saturated luminance point X obtained by the luminance region calculation unit 205. As a result of the comparison, if the luminance value Y(i, j) is equal to or more than the fully-saturated luminance point X (YES in step S904), the process advances to step S908. Otherwise (NO in step S904), the process advances to step S905.

In step S905, the display image generation unit 206 compares the luminance value Y(i, j) and the tone degradation luminance point M obtained by the luminance region calculation unit 205. As a result of the comparison, if the luminance value Y(i, j) is equal to or more than the tone degradation luminance point M (YES in step S905), the process advances to step S907. Otherwise (NO in step S905), the process advances to step S906.

In step S906, the display image generation unit 206 determines to use the original pixel value P(i, j) as the value of the pixel P'(i, j). Subsequently, the process advances to step S909.

In step S907, the display image generation unit 206 determines that the value of the pixel P'(i, j) is to be set to green, that is, (R, G, B)=(0, 255, 0). Subsequently, the process advances to step S909.

In step S908, the display image generation unit 206 determines that the value of the pixel P'(i, j) is to be set to black, that is, (R, G, B)=(0, 0, 0). Subsequently, the process advances to step S909.

In step S909, the display image generation unit 206 determines whether the processing has been performed on all of the pixels of the image. If the processing has not been performed on all of the pixels (NO in step S909), the process returns to step S901 to perform the processing on an unprocessed pixel. For example, the value of i and/or j can be incremented at this time to move the processing target to the next unprocessed pixel. If the processing has been performed on all of the pixels (YES in step S909), this processing procedure ends.

[Example of Processing Result]

Figure 10A:
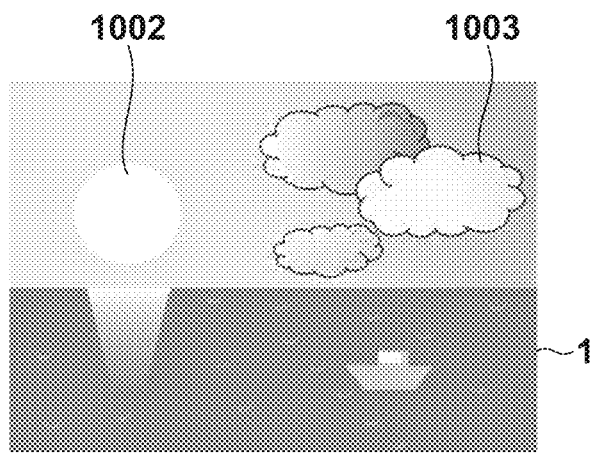
FIGS. 10A, 10B, 10C, 10D, and 10E are views showing a display example of the present invention.

Each of FIGS. 10A to 10E shows an example of a processing result according to this embodiment. FIG. 10A is the image I that is displayed normally, and each pixel includes the signal value of the pixel P (i, j). The captured scene of the image is a scene capturing a sun 1002 sinking into a sea 1001 at sunset, and clouds 1003 are also present in the sky.

Figure 10D:
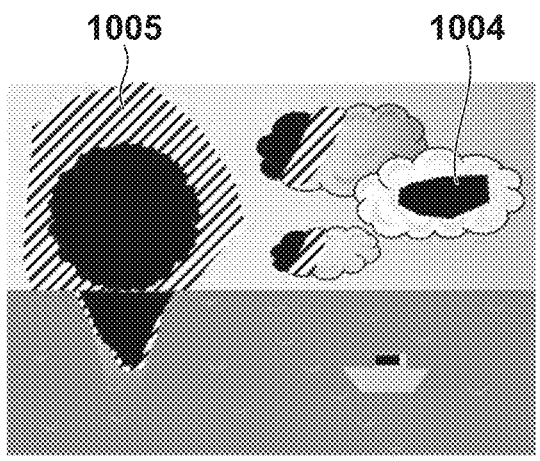
Figure 10B:
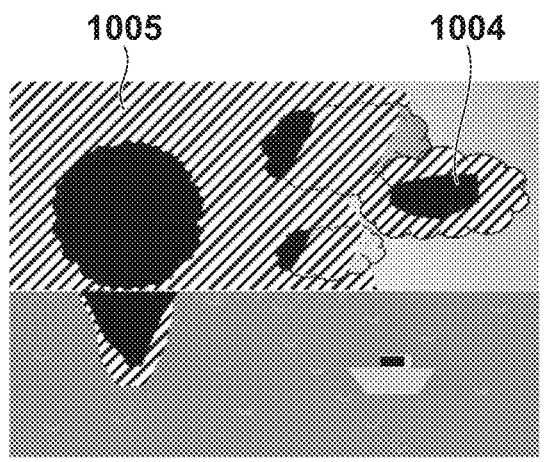

FIG. 10B is a display image that has been applied with the processing according to this embodiment. A region 1004 filled with black in FIG. 10B represents a saturated portion that has been converted into white pixels. This region 1004 is a region that cannot be restored by any kind of subsequent processing operations. A region 1005 represented by oblique lines in FIG. 10B is a region filled with green. This region 1005 is a region whose tonality can be improved by the above-described highlight restoration function, or the like.

As the display method of an image that has undergone the processing according to this embodiment, FIG. 10B may be displayed by a predetermined button or a predetermined operation or by alternately switching the display with the display of FIG. 10A. Alternatively, both of pre- and post-processing images may be aligned and displayed together. That is, it suffices to display the image so that each region will be specifiable.

Figure 10E:
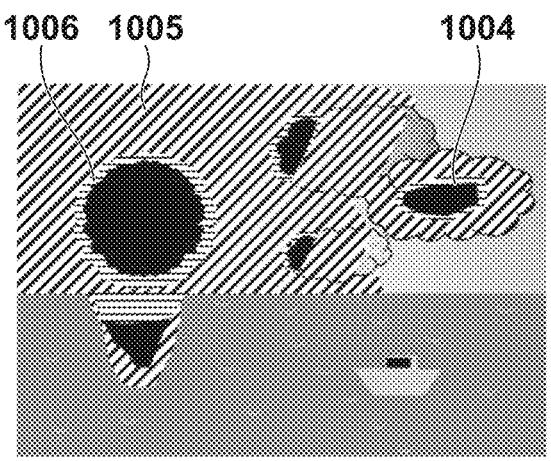
Figure 10C:
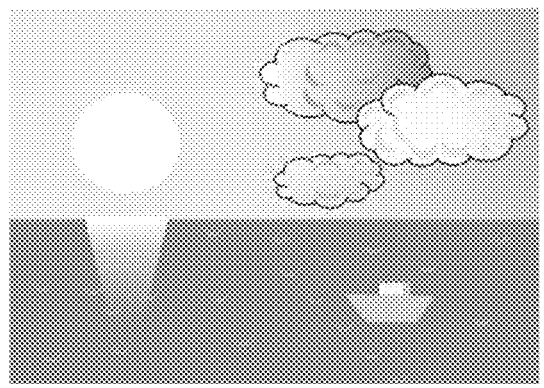

FIG. 10C shows a state in which the above-described processing performed by the highlight restoration unit 207 based on the instruction of the user has been applied to the image I shown in FIG. 10A. At this time, compared to FIG. 10A, the tonality of regions other than the region 1004 has improved in FIG. 10C.

FIG. 10D is an example of the same scene displayed in the case of a high-luminance display apparatus. As shown in FIG. 8, since the high-luminance display performance of the display apparatus will improve compared to the case of FIG. 7, the tone degradation luminance point M shifts to the high-luminance side. As a result, the green region 1005 has decreased compared to FIG. 10B in the display image of FIG. 10D.

As described above, this embodiment implements an arrangement in which the image processing apparatus 20, including the image capturing apparatus 23 and the display apparatus 21, presents tone restorability on the display apparatus. Hence, the user can be notified, in a specifiable manner, of regions in which the tone can be restored in the image. As a result, for example, it allows the user to perform image capturing by confirming regions in which the tonality can be restored, and to reduce image capturing failures and improve work efficiency.

Second Embodiment

The first embodiment described an example in which the display of tone reproducibility was classified into three regions. More specifically, a black region that has degraded and cannot be restored, a green region that has degraded but can be restored, and a region without tone degradation were displayed. The second embodiment of the present invention will describe an example in which the display region will be further classified to notify a user in a more detailed manner. Note that a description of parts that overlap those of the first embodiment will be omitted, and only the differences will be described.

In this embodiment, in the same manner as the first embodiment, a display image generation unit 206 generates, from image data I which includes a pixel value P(i, j), image data I' which includes a pixel P'(i, j) to be used for tone reproducibility notification. In this embodiment, the image data I' will be described by using an example of a display image that has been classified into the following four regions:

A region with tone degradation/P(i, j) is a white pixel/restoration is impossible.

A region without tone degradation/P(i, j) is a white pixel/restoration is possible.

A region with tone degradation/P(i, j) is not a white pixel/restoration is possible.

A region without tone degradation/P(i, j) is not a white pixel/restoration is possible.

That is, this embodiment has an arrangement in which it is possible to further notify the user of a region indicating a region between a tone degradation luminance point M and a saturation starting point N shown in FIG. 7 in the first embodiment. Note that it may be arranged so that the region will be a region between a point M' and the saturation starting point N depending on the settings.

P'(i, j) is generated so that each display region will have the following values. Note that the numbers within the parentheses indicate R, G, and B signal values.

1: black pixel P'(i, j)=(0, 0, 0)
2: yellow pixel P'(i, j)=(255, 255, 0)
3: green pixel P'(i, j)=(0, 255, 0)
4: original pixel P'(i, j)=P(i, j)

Note that the combination of colors of the display is not limited to those described above, and for example, the display mode may be arbitrarily settable by the user.

[Processing Procedure]

Figure 11:
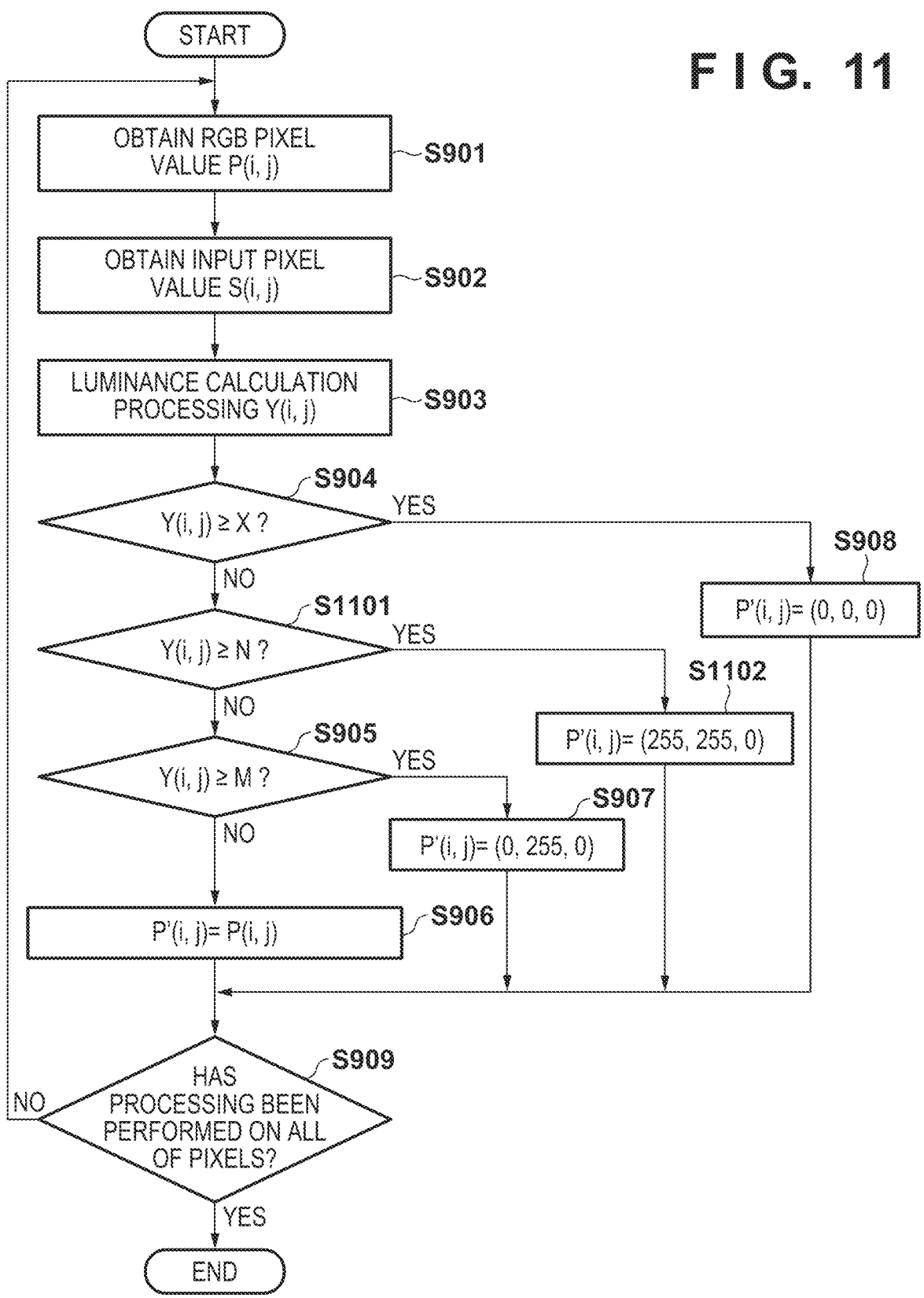
FIG. 11 is a flowchart of processing of a luminance region calculation unit according to the second embodiment of the present invention.

FIG. 11 is a flowchart of processing for generating a display image according to this embodiment. This processing is executed by the display image generation unit 206. Note that the same reference numbers are used to denote processes that overlap those already described in FIG. 9 of the first embodiment, and only the differences will be described below.

As a result of comparison in step S904, if a luminance value Y(i, j) is equal to or greater than a fully-saturated luminance point X (YES in step S904), the process advances to step S908. Otherwise (NO in step S904), the process advances to step S1101.

In step S1101, the display image generation unit 206 compares the luminance value Y(i, j) and the saturation starting point N obtained by a luminance region calculation unit 205. As a result of the comparison, if the luminance value Y(i, j) is equal to or greater than the saturation starting point N (YES in step S1101), the process advances to step S1102. Otherwise (NO in step S1101), the process advances to step S905.

In step S1102, the display image generation unit 206 determines yellow, that is, (R, G, B)=(255, 255, 0) as the value of P'(i, j). Subsequently, the process advances to step S909.

[Example of Processing Result]

FIG. 10E shows an example of a processing result according to this embodiment. In FIG. 10E, a region 1006 represented by horizontal lines indicates a region that can be restored in a subsequent highlight restoration processing operation. On the other hand, a region 1004 represented in black indicates a region that cannot be restored in a subsequent highlight restoration processing operation. In this manner, by presenting each display region as a processing result by this embodiment, it will be possible for the user to specify, even if the pixel is a white pixel, a region which can be restored and a region that cannot be restored in the highlight restoration processing to be performed after the image capturing operation.

As described above, this embodiment implements an arrangement that can notify the user of more detailed information by further subdividing the tone reproducibility on the high-luminance side compared to the first embodiment. Note that this arrangement may be extended onto the comparison with the saturation starting point N in the determination (step S905 of FIG. 9) of a restorable green region described in the first embodiment. In such a case, the green region will represent a tone degradation region that can be restored.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   at least one processor operatively coupled to a memory, serving as:
   a first obtainment unit configured to obtain a luminance value of image data corresponding to a first luminance range;
   a second obtainment unit configured to obtain information for a second luminance range that is less than the first luminance range;
   a classification unit configured to classify, based on a correspondence relationship of luminance value conversion from the first luminance range to the second luminance range, the first luminance range of the image data into a plurality of regions; and
   a display unit configured to cause a display device to display an image based on the image data such that a pixel of the image that has a luminance value of the image data that belongs to a region, in which a tone characteristic in the image data can be restored in a case when the luminance value conversion is performed, can be specified in the displayed image.

2. The image processing apparatus according to claim 1, wherein, in a case when the luminance value conversion is performed, the classification unit further classifies the first luminance range into a saturated luminance value region in which the luminance value of the image data is converted to a maximum value in the second luminance range and an unsaturated luminance value region.

3. The image processing apparatus according to claim 2, wherein the classification unit classifies the saturated luminance value region by using a reference luminance value in which at least one of R (red), G (green), and B (blue) pixel values of the image data has become saturated.

4. The image processing apparatus according to claim 1, wherein the classification unit further classifies the first luminance range into a first region in which the tone characteristic has degraded and a second region in which the tone characteristic has not degraded in a case when the luminance value conversion is performed.

5. The image processing apparatus according to claim 4, wherein the classification unit classifies the first region in which the tone characteristic has degraded by using, as a reference, a reference luminance value in which an input value and an output value will match in the correspondence relationship of the luminance value conversion from the first luminance range to the second luminance range.

6. The image processing apparatus according to claim 1, wherein the classification unit classifies, based on image capturing information of an image capturing apparatus that have captured a target for obtaining the image data, the region in which the tone characteristic can be restored.

7. The image processing apparatus according to claim 6, wherein the image capturing information includes information of a characteristic of a sensor used in a photoelectric conversion unit included in the image capturing apparatus.

8. The image processing apparatus according to claim 1, wherein the display unit causes the display device to display the plurality of regions by different display modes.

9. The image processing apparatus according to claim 1, wherein restoration of the tone characteristic is performed by converting the luminance value of a low-frequency component of a pixel of an image indicated by the image data to the luminance value corresponding to the second luminance range and superimposing a high-frequency component of the image data on the obtained luminance value of the low-frequency component by the luminance value conversion.

10. The image processing apparatus according to claim 9, wherein the low-frequency component and the high-frequency component are determined based on information of a viewing environment when the image data is output.

11. The image processing apparatus according to claim 1, wherein the image data is RAW data photoelectrically converted by an image capturing element.

12. The image processing apparatus according to claim 1, wherein the at least one processor also serves as a conversion unit configured to convert the luminance value of the image data to the luminance value corresponding to the second luminance range.

13. The image processing apparatus according to claim 12, wherein the at least one processor also serves as a superimposing unit configured to superimpose a high-frequency component of the image data on the luminance value of a low-frequency component obtained by conversion by the conversion unit.

14. An image processing method comprising:
   obtaining a luminance value of image data corresponding to a first luminance range;
   obtaining information for a second luminance range that is less than the first luminance range;
   classifying, based on a correspondence relationship of luminance value conversion from the first luminance range to the second luminance range, the first luminance range of the image data into a plurality of regions; and
   causing a display device to display an image based on the image data such that a pixel of the image that has a luminance value of the image data that belongs to a region, in which a tone characteristic in the image data can be restored in a case when the luminance value conversion is performed, can be specified in the displayed image.

15. A non-transitory computer-readable storage medium storing a program that causes a computer to function as
   a first obtainment unit configured to obtain a luminance value of image data corresponding to a first luminance range;

a second obtainment unit configured to obtain information for a second luminance range that is less than the first luminance range;

a classification unit configured to classify, based on a correspondence relationship of luminance value conversion from the first luminance range to the second luminance range, the first luminance range of the image data into a plurality of regions; and a display unit configured to cause a display device to display an image based on the image data such that a pixel of the image that has a luminance value of the image data that belongs to a region, in which a tone characteristic in the image data can be restored in a case when the luminance value conversion is performed, can be specified in the displayed image.

16. The non-transitory computer-readable storage medium according to claim 15, wherein, in a case when the luminance value conversion is performed, the classification unit further classifies the first luminance range into a saturated luminance value region in which the luminance value of the image data is converted to a maximum value in the second luminance range and an unsaturated luminance value region.

17. The non-transitory computer-readable storage medium according to claim 16, wherein the classification unit classifies the saturated luminance value region by using a reference luminance value in which at least one of R (red), G (green), and B (blue) pixel values of the image data has become saturated.

18. The non-transitory computer-readable storage medium according to claim 15, wherein the classification unit further classifies the first luminance range into a first region in which the tone characteristic has degraded and a second region in which the tone characteristic has not degraded in a case when the luminance value conversion is performed.

19. The non-transitory computer-readable storage medium according to claim 18, wherein the classification unit classifies the first region in which the tone characteristic has degraded by using, as a reference, a reference luminance value in which an input value and an output value will match in the correspondence relationship of the luminance value conversion from the first luminance range to the second luminance range.

20. The non-transitory computer-readable storage medium according to claim 15, wherein the classification unit classifies, based on image capturing information of an image capturing apparatus that have captured a target for obtaining the image data, the region in which the tone characteristic can be restored.

* * * * *